United States Patent [19]

Watt

[11] Patent Number: 4,747,353

[45] Date of Patent: May 31, 1988

[54] STRAIGHT LINE MOTION MECHANISM

[75] Inventor: Richard L. Watt, Jamestown, N.Y.

[73] Assignee: Weber-Knapp Company, Jamestown, N.Y.

[21] Appl. No.: 917,859

[22] Filed: Oct. 14, 1986

[51] Int. Cl.[4] .......................... A47B 9/00; F16M 11/00; F16M 13/00

[52] U.S. Cl. ..................... 108/146; 108/144; 108/147; 248/157; 248/421

[58] Field of Search ............... 108/145, 146, 147, 148, 108/118; 248/421, 422

[56] References Cited

U.S. PATENT DOCUMENTS

| | | | |
|---|---|---|---|
| 537,081 | 4/1895 | Starkey | 248/422 |
| 699,939 | 5/1902 | Woodruff | 248/422 |
| 4,590,865 | 1/1984 | Rütsche et al. | 108/147 |
| 4,627,591 | 12/1986 | Heckmann | 108/148 |

FOREIGN PATENT DOCUMENTS

| | | | |
|---|---|---|---|
| 0210712 | 8/1960 | Austria | 74/103 |
| 0515132 | 11/1952 | Belgium | 108/147 |
| 1808520 | 11/1968 | Fed. Rep. of Germany | 248/421 |
| 3303193 | 8/1984 | Fed. Rep. of Germany | 108/147 |

Primary Examiner—Leslie A. Braun
Assistant Examiner—Scott Anchell
Attorney, Agent, or Firm—Bean, Kauffman & Bean

[57] ABSTRACT

A straight line motion mechanism is formed from a pair of parallelogram linkage mechanisms in combination with motion control means interconnecting the linkage mechanisms to provide for uniform angular displacement thereof. The mechanism is particularly adapted for use in supporting an object, such as a table top, for vertically directed stepwise movement or one step shifting between lower and upper reference positions corresponding to table top heights convenient for use alternatively by a person in seated and standing positions. In a preferred embodiment, means are provided to enable a user to selectively make fine adjustments of the height of the table top after it has been shifted into either of such lower and upper reference positions.

18 Claims, 4 Drawing Sheets

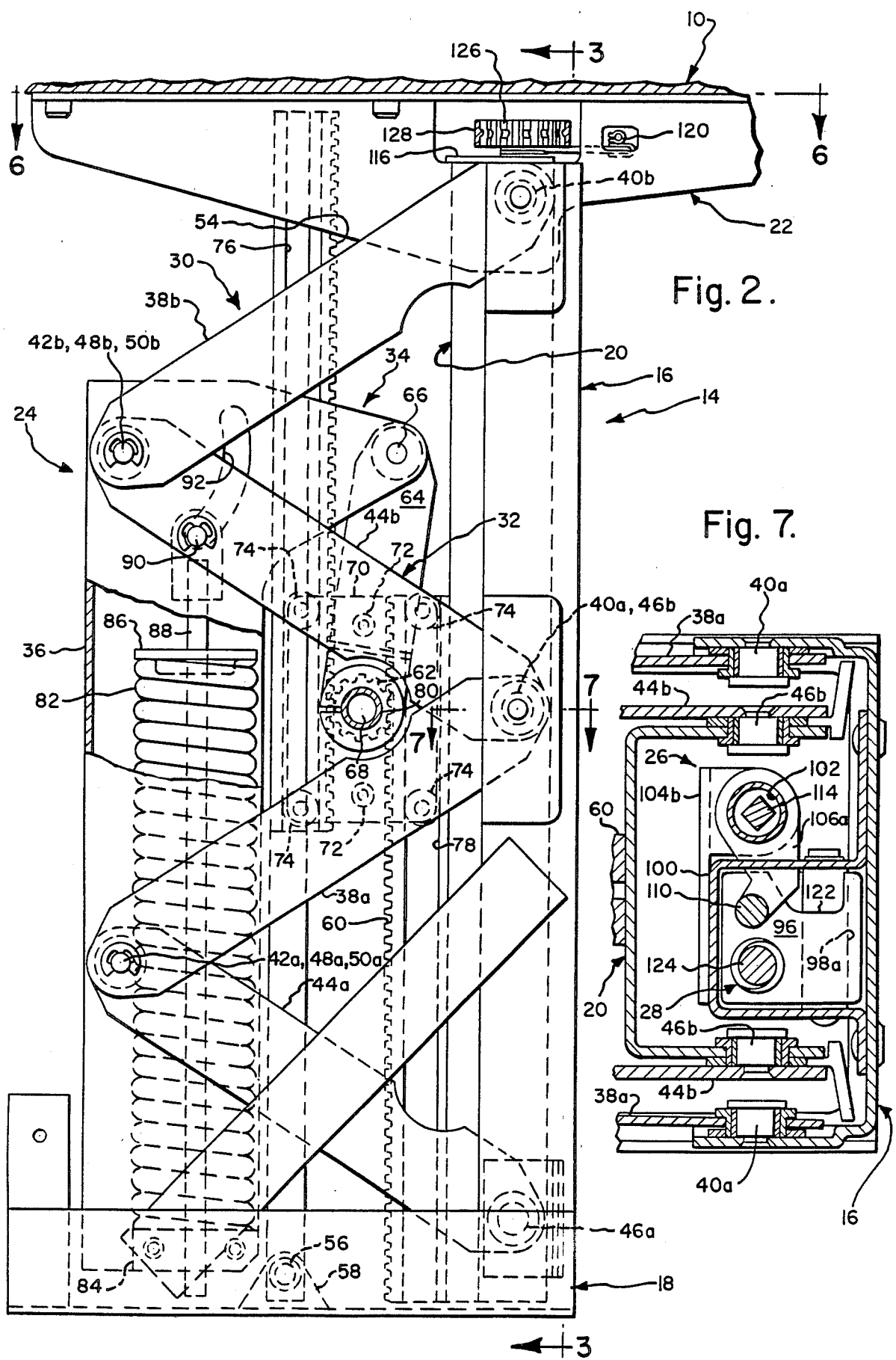

U.S. Patent    May 31, 1988    Sheet 3 of 4    4,747,353
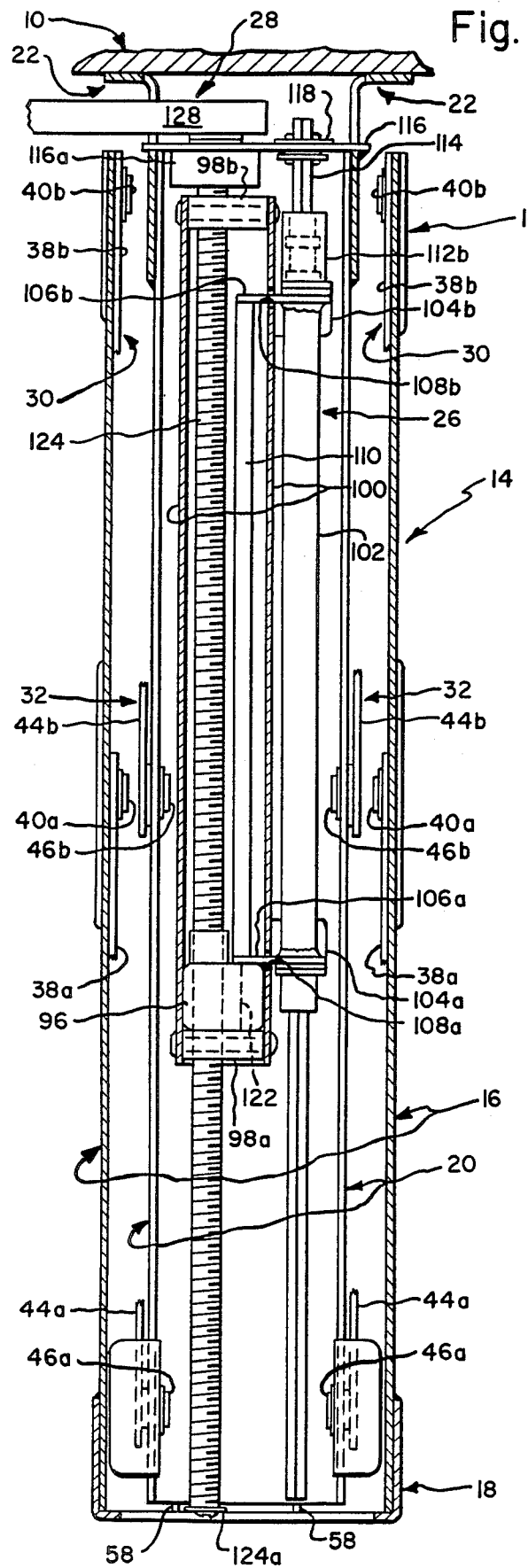
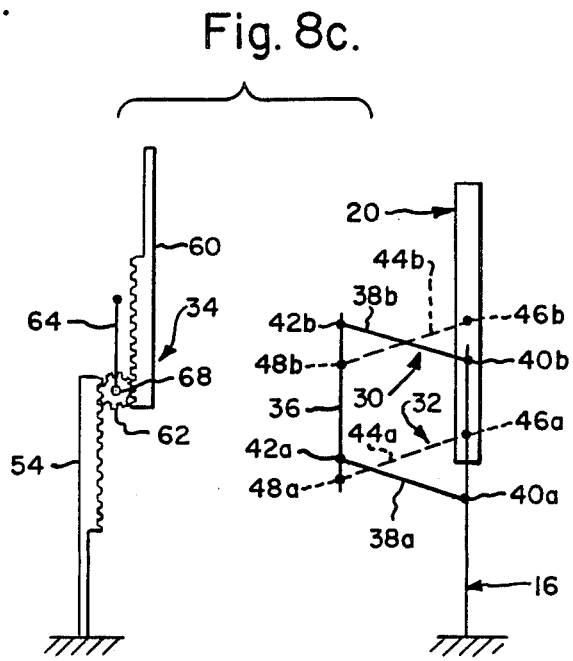
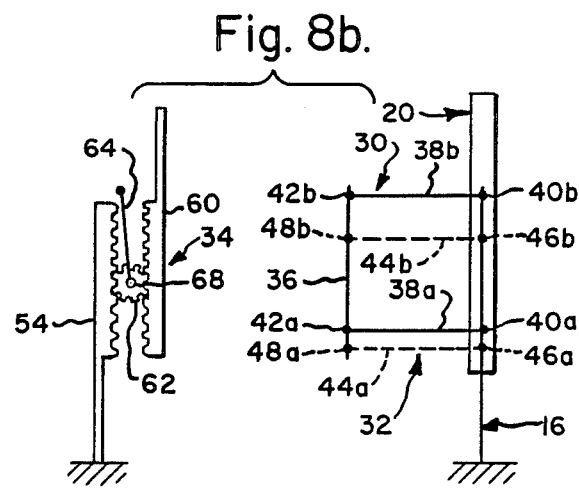
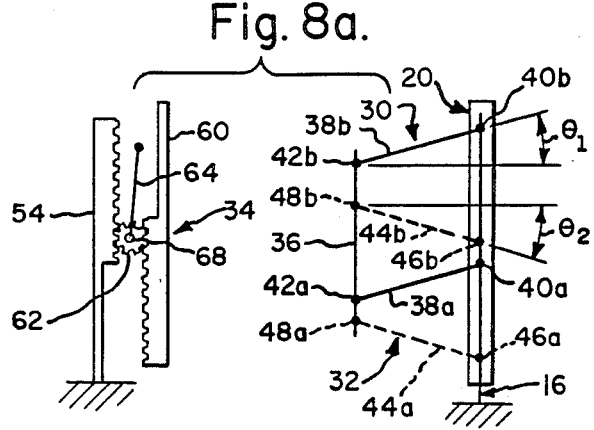

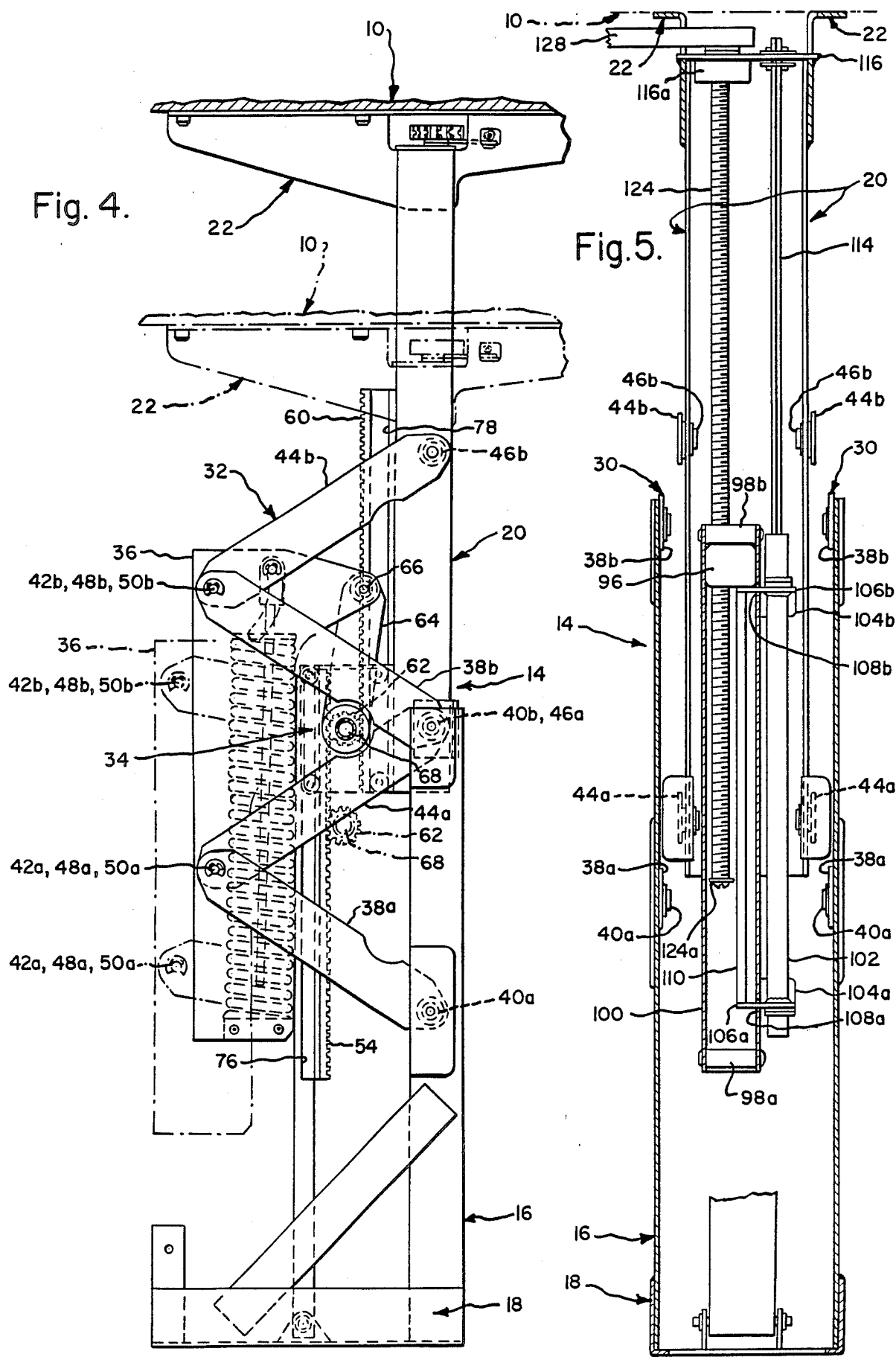

STRAIGHT LINE MOTION MECHANISM

BACKGROUND OF THE INVENTION

It is known to provide diverse mechanisms to permit an object or member to be moved along a straight line path of travel relative to another member between a pair of chosen or pre-established positions. However, as far as I am aware, these prior mechanisms, with the exception of multiple piston and multiple part slide mechanisms, are not capable of permitting relative movement of the members through a distance exceeding the contracted length of the mechanism,n or are such prior mechanisms capable of permitting independent or fine adjustments of the position of the object relative to each of such pre-established positions between which the object can be alternatively and repeatedly moved in a stepwise manner.

SUMMARY OF THE INVENTION

The present invention is directed towards a straight line motion mechanism permitting displacements of an object through a distance, which may substantially exceed the contracted length of the mechanism.

More particularly, the invention is directed towards a straight line motion mechanism adapted for use in supporting an object for movement along a path of travel alternatively between first and second reference positions in which the object is releasably latched in combination with means allowing for further selected fine adjustments of the position of the object with respect to each of such reference positions.

The present straight line motion mechanism includes a pair of parallelogram linkage mechanisms and motion control means interconnecting such mechanisms to insure that the mechanisms move at the same rate, wherein a first linkage mechanism includes a stationary link member arranged in facing relation to a second link member and a first pair of facing links, and a second linkage mechanism includes the second link member and a facing movable member and a second pair of facing links. The first and second pairs of facing links are of equal lengths and the mechanisms arranged such that the facing links undergo equal angular displacements about their points of pivotal connection to the stationary, second link and movable members as the movable member moves relative to the stationary member along a straight line path of travel between contracted and extended conditions of the mechanism.

In a preferred form of the present invention, the straight line motion mechanism is employed in combination with a latch mechanism for releasably retaining the movable member alternately in first and second reference positions spaced along its path of travel and an adjustment mechanism operable to effect movement of the movable member relative to such reference positions along the path of travel.

The straight line motion mechanism of the present invention is particularly adapted for use in supporting an object, such as a table top, for vertically directed movements between lower and upper reference positions, wherein the table top is releasably latched alternatively at heights suitable for use by a user in seated and standing positions in combination with means allowing for fine adjustments of the vertical position of the table top relative to such lower and upper positions, as required for the convenience and comfort of a given user.

BRIEF DESCRIPTION OF THE DRAWINGS

The nature and mode of operation of the present invention will now be more fully described in the following detailed description taken with the accompanying drawings wherein:

FIG. 2 is a sectional view taken generally along the line 2—2 in FIG. 1;

FIG. 3 is a sectional view taken generally along the line 3—3 in FIG. 2;

FIG. 4 is a sectional view similar to FIG. 2, but on a reduced scale and illustrating intermediate and upper positions of the mechanism;

FIG. 5 is a sectional view similar to FIG. 3, but on a reduced scale and showing an intermediate position of the mechanism corresponding to the broken line representation illustrated in FIG. 4;

FIG. 7 is a sectional view taken generally along the line 7—7 in FIG. 2; and

FIGS. 8a, 8b and 8c are diagrammatic views illustrating successive stages of operation of the present mechanism with the motion control mechanism being shown in an offset relation to the parallelogram linkage mechanism to facilitate understanding of their respective modes of operation.

DETAILED DESCRIPTION OF THE INVENTION

Figure 1:
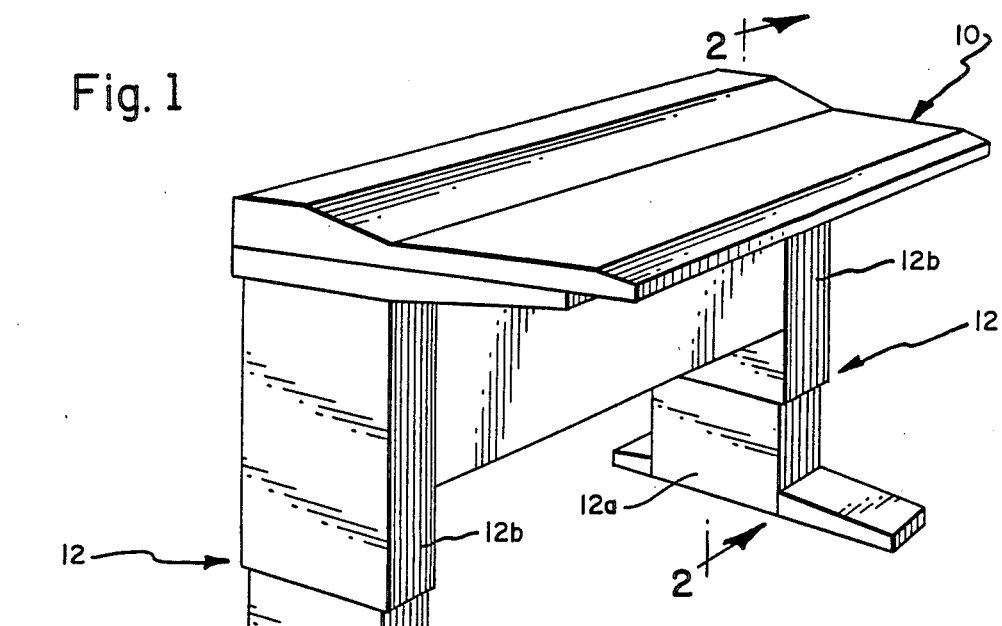
FIG. 1 is a perspective view showing a vertically adjustable table or the like incorporating the present invention.

Reference is first made to FIG. 1, wherein an object, such as a table top 10, is shown as being supported by a pair of pedestals 12 each including lower and upper decorative and telescopically arranged housings 12a and 12b serving to enclose the mechanism 14 of the present invention to be hereinafter described with reference to FIGS. 2 through 8c.

Now referring particularly to FIGS. 2, 3 6 and 7, it will be understood that mechanism 14 generally comprises a stationary, vertically elongated stationary member 16 defined for example by a U-shaped channel fixed to vertically upstand from a base 18 defined for example by a floor supported U-shaped channel; a vertically elongated, movable member so defined for example by a U-shaped channel having its upper end connected to the lower surface of table top 10 by horizontally disposed brackets 22; a straight line motion mechanism 24 for supporting movable member 20, and thus table top 10, on stationary member 16 for essentially straight line movement along a vertical path of travel including a first or lower reference position and a second or upper reference position; a latch mechanism 26 for releasably latching the table top alternatively in its first and second reference positions; and adjustment mechanism 28 for producing fine adjustments of the height of table top 10, adjacent such first and second reference positions. As will be apparent, lower pedestal housing 12a is stationary and fixed to stationary member 16 and base 18 and upper pedestal housing 12b is fixed to depend from table top 10 for movement with movable member 20.

Mechanism 14 allows a user to quickly move table top 10 alternatively between an established lower position in which the table top is proximately positioned for use by the user seated on a chair and an established upper position in which the table top is proximately positioned for use by the user standing adjacent to the table, and thereafter to make fine adjustment of the height of the table top, while it is in one or the other of such lower and upper positions, as required for the comfort and convenience of such user.

Figure 6:
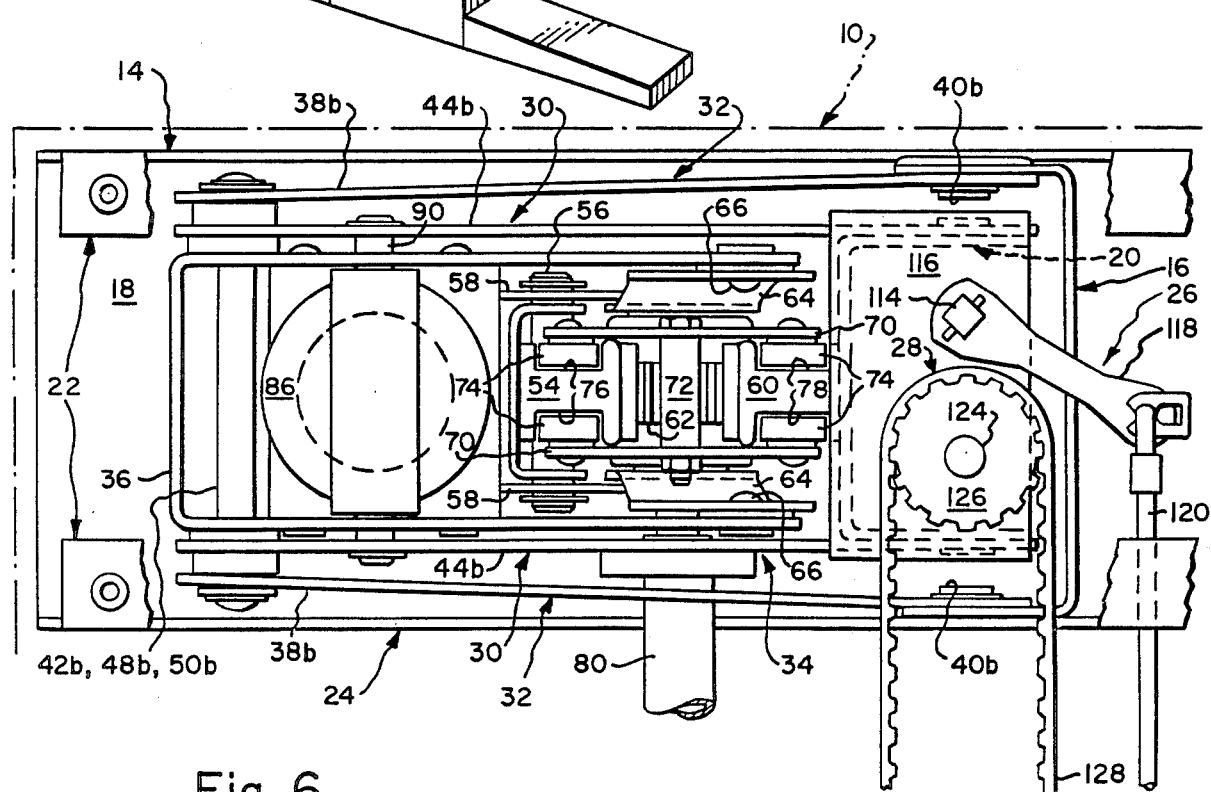
FIG. 6 is a sectional view taken generally along the line 6—6 in FIG. 2.

Straight line motion mechanism 24 basically includes at least one pair of parallelogram linkage mechanisms 30 and 32 serving to operably interconnect movable member 20 to stationary member 16 and a motion control mechanism 34 for interconnecting the linkage mechanisms in a manner to insure that movable member 20 will move along essentially a straight line path of travel for purposes of lifting and lowering table top 10. Preferably, as indicated in FIGS. 3, 5 and 6, each mechanism 14 is fitted with two pairs of parallelogram linkage mechanisms, but it is deemed necessary to describe only one pair of such mechanisms as an aid in the full understanding of the operation of the present invention.

First parallelogram linkage mechanism 30 is defined by stationary member 16 and a facing parallel second link member 36 in the form of an upstanding U-shaped channel, and a first pair of facing links 38a and 38b, which have their opposite ends pivotally connected to members 16 and 36 by pivot devices 40a,42a and 40b,42b. Second parallelogram linkage mechanism 32 is composed of movable member 20 and facing parallel second link member 36 and a second pair of facing parallel links 44a and 44b, which have their opposite ends pivotally connected to members 20 and 36 by suitable pivot devices 46a,48a and 46b,48b. In the presently preferred construction, a pair of common pivot pins 50a and 50b serve to define pivot devices 42a,48a and 42b,48b such that the first and second pairs of facing links of mechanisms 30 and 32 swing relative to second link member 36 about a pair of parallel vertically separated axes. Also, in the presently preferred construction, the parts are sized and positioned such that pivot devices 40a and 46b are disposed in alignment when table top 10 is in its lowermost position shown in FIG. 2 and that pivot devices 40b and 46a are disposed in alignment when table top 10 is in its uppermost position shown in full line in FIG. 4. Thus, it will be noted that in the illustrated construction, linkage mechanisms 30 and 32 are identical in size and pivot devices 46a and 46b are constrained for movement within a vertical plane bisecting pivot devices 40a and 40b. The distance between pivot device 40a and pivot device 40b, which is equal to the distance between pivot device 42a and pivot device 42b, is not required to be equivalent to the distance between pivot device 46a and pivot device 46b, which is equal to the distance between pivot device 48a and pivot device 48b. It is also not required to place pivot devices 42a and 42b in alignment with pivot devices 48a and 48b. Rather, for mechanism 24 to function properly, it is necessary that the lengths of the pairs of facing links 38a,38b and 44a,44b be equal; and that linkage mechanisms 30 and 32 be arranged and operably coupled by motion control mechanism 34 such that the linkage mechanisms move at equal rates, but in opposite directions, relative to second link member 36, as indicated in FIG. 8a, where angle $\theta_1$ is equal, but opposite to and $\theta_2$. Otherwise stated, equal length links 38a,38b and 44a,44b form equal and opposite angles relative to a line(s) drawn normal to members 16, 20 and 36, during movement of movable member 20 between the mechanism contracted condition of FIG. 8a and an intermediate or over center condition of FIG. 8b, and between such intermediate condition and the mechanism extended condition of FIG. 8c and are parallel to such line in such intermediate position.

Motion controlling mechanism 34 comprises a first rack member 54, which is suitably fixed against movement lengthwise of stationary member 16, as by a pivot pin 56 carried by base mounted brackets 58; a second rack member 60, which is suitably fixed to movable member 20 for vertical movement therewith and arranged in a facing relationship with the first rack member; a gear 62 arranged in engagement with the rack members for transmitting movement therebetween; and one or more links 64, which have their upper ends pivotally connected to second link member 36 by aligned pivot pins 66 and have their lower ends fitted with a pin 68 serving to journal gear 62. Pin 68 additionally serves to support a guide assembly comprising a pair of vertically disposed plates 70, which are apertured to receive pin 68 and held in spaced parallel relationship by a pair of spacer pins 72, and four pairs of guide rollers 74, which are rotatably supported by plates 70, and received within pairs of oppositely facing guide slots 76 and 78 formed in rack members 54 and 60, respectively. By this arrangement, rack members 54 and 60 are retained in engagement with gear 62 and the axis of gear supporting pin 68 is permitted to move vertically with second link member 36 without being forced to undergo horizontal displacements therewith, as the second link member moves away from and then towards stationary member 16, as linkage mechanisms 30 and 32 move over center in the manner indicated in FIGS. 4 and 8b. While the illustrated construction of mechanism 34 is preferred in that it allows for a relatively small overall width of mechanism 14, as viewed in FIGS. 2 and 4, same may be replaced by any suitable linkage or pulley mechanism capable of insuring that linkage mechanisms 30 and 32 move at the same rate.

When mechanisms 14 are employed in tandem, such as would normally be the case with a table installation of the type shown in FIG. 1, the mechanisms would preferably be coupled to insure uniform operation thereof by suitable means, such as a torsion bar 80 having its opposite ends rigidly fixed for rotation with the gears 62 of such mechanisms. Also, when mechanism 14 is intended to be employed in the table installation shown in FIG. 1, it is preferable to provide a conventional counterbalance type mechanism tending to bias table top 10 for movement between its lowermost and uppermost positions shown in FIGS. 2 and 4. In the illustrated construction, such counterbalance mechanism is defined by a biasing device in the form of a compression spring 82, which is enclosed within second link member 36 and has its lower end arranged to bear against an end block 84 carried by the second link member and its upper end arranged to bear against a bearing plate 86 fixed to a rod 88 whose upper end mounts a pivot pin 90. Pin 90 is freely received within an arcuate slot 92 formed in second link member 36 and has its opposite ends pivotally coupled to both links 44b shown in FIG. 6. The placement of the counterbalance mechanism within mechanism 14 is not limited to the illustrated to FIG. 2, since it could be employed to resiliently interconnect second link member 36 to linkage mechanism 30 or to connect stationary member 16 to either of linkage mechanisms 30 or 32.

The lower and upper reference positions of table top 10 are preferably defined by latch mechanism 26, which will now be described with particular reference to FIGS. 3, 5, 6 and 7. Latch mechanism 26 generally includes stationary and movable latch parts to be described, which cooperate with an adjustable block 96 forming a part of adjustment mechanism 28. More specifically, the stationary latch part includes a first or lower and a second or upper abutment defined for instance by abutment pins 98a and 98b rigidly fixed to extend transversely of the lower and upper ends of a guide channel 100, which is in turn rigidly fixed to stationary member 16 and arranged to project into movable member 20 in the manner best shown in FIG. 7. Guide channel 100 is formed with an essentially square cross section and adapted to constrain adjustment block 96 against rotation about a vertical axis extending lengthwise of the guide channel, while permitting free sliding movement of the adjustment block vertically therewithin. The movable part of the latch mechanism includes a carrier member or tube 102, which is rotatably supported on guide channel 100 by lower and upper bearing brackets 104a and 104b; vertically aligned lower and upper latch arms 106a and 106b, which are rigidly fixed to and extend transversely of the lower and upper ends of carrier member 102 with their free ends projecting inwardly of guide channel 100 through lower and upper access slots 108a and 108b formed in a side wall of the guide channel; a guide member 110 fixed to the free ends of latch arms 106a and 106b to extend between facing surfaces thereof; and carrier member attached upper coupling device 112b formed with a square aperture sized to slidably receive a vertically extending square cross sectioned rod 114 whose upper end is supported for rotation by an upper plate 116 fixed for vertical movement with movable member 20 relative to the coupling device. As best shown in FIG. 6, the upper end of rod 114 is keyed for rotation with link 118, which is in turn connected to a user operable latch release mechanism including a motion transmitting device 120 and a spring device, not shown, which normally serves to bias latch arms 106a and 106b into their latched positions shown in the case of latch arm 106a in FIG. 7, wherein the latch arms are disposed out of alignment with a latch release slot 122 extending vertically through adjustment block 96. As will be apparent from viewing FIGS. 3, 5 and 7, when latch arms 106a and 106b are in their latched positions, their oppositely facing surfaces are adapted to cooperate with abutment pins 98a and 98b for the purpose of retaining adjustment block 96 alternatively in its lower or upper reference positions. On the other hand, upon user induced rotation of rod 114 in a counterclockwise direction, as viewed in FIG. 7, latch arms 106a and 106b may be moved into a release position disposed in vertical alignment with release slot 122, so as to free adjustment block 96 for vertical sliding movement or stepwise displacement within guide channel 100 between its lower and upper reference positions shown respectively in FIGS. 3 and 5. During movement of adjustment block 96 between these lower and upper positions, sliding engagement of guide member 110 within release slot 122 prevents unintended return of latch arms 106a and 106b to their latched positions under the bias provided by the user operable latch release mechanism. Thus, adjustment member 96 can only be latched in one or the other of its lower and upper positions between which the adjustment member and table top 10 move in a stepwise manner.

Again referring particularly to FIGS. 3, 5, 6 and 7, it will be understood that adjustment mechanism 28 includes in addition to adjustment block 96 a vertically disposed adjustment screw 124, which extends lengthwise within guide channel 100 and is threadably coupled to block 96. The upper end of adjustment screw 124 is rotatably supported by upper plate 116 and keyed for rotation with a drive gear 126 forming a part of a user operable adjustment control mechanism shown in part as including a flexible drive belt 128. The user operable latch release and adjustment control mechanisms are operably connected to each mechanism 14 and may be suitably attached to the lower surface of table top 10 in a position readily accessible to a user.

When adjustment block 96 is latched in its lower reference position shown in FIG. 3, movable member 20 is constrained against vertically directed, extending movement under the bias provided by compression spring 82 in that the movable member is coupled to the adjustment block by adjustment screw 124. This serves to establish a lower position for table top 10, which is proximately located for use by a user when seated on a chair. However, if desired, the user may adjust the actual height of table top 10 by imparting rotations to adjustment screw 124 in order to effect translations thereof relative to adjustment block 96 between a lower limit suitably defined for instance by an abutment 116a, which depends from upper plate 116 for engagement with the upper end of guide channel 100, or by the bottoming out of the lower end of the adjustment screw against a floor, as shown in FIG. 3, and an upper limit suitably defined for instance by motion limiting engagement of an adjustment screw mounted end plate 124a with the lower surface of adjustment block 96.

When a user desired to move table top 10 into an upper position in which it is proximately located for use while the user is standing, latch mechanism 26 is released so as to permit movement of adjustment block 96 into its upper reference position shown in FIG. 5, wherein it is thereafter retained by the return of the latch mechanism to latched condition. Assuming for example that the adjusted position of adjustment screw 124 relative to adjustment block 96 is the same in the lower and upper reference positions of the adjustment block, as shown in FIGS. 3 and 5, table top 10 will be moved into an upper reference position shown in broken line in FIG. 4 incident to movement of the adjustment block into its upper reference position shown in FIG. 5. Thereafter a user may, if desired, adjust the actual height of table top 10 by rotating adjustment screw 124 relative to adjustment block 96, while the latter is latched in its upper reference position. The upper adjusted limit of table top 10 is shown in full line in FIG. 4 and is determined for example by engagement of end plate 124a with the lower surface of adjustment block 96. A lower adjusted position, not shown, of table top 10 for the case wherein adjustment block 96 is latched in its upper reference position, would be determined for example by engagement of abutment 116a with the upper end of guide channel 100. In the absence of intended adjustments of screw 124 by a user, the lower and upper reference positions of table top 10 are repeatable each time the table top is lowered and raised.

As desired, the counterbalance mechanism may be chosen/adjusted to support the whole or any part of the weight of table top 10, as well as to overcome all or part of the frictional effects inherent in mechanism 14. Typically, it is desirable for the counterbalance mechanism to be designed or adjusted in order to essentially support the entire weight of table top 10, and to rely on frictional effects to provide a brake limiting unattended movement of the table top upon release of latch mechanism 26, that is, to require a user to intentionally exert force on the table top to overcome the frictional braking effects in order to move same between its lower and upper positions defined by the permitted extent of movement of adjustment block 96. However, if desired, the force exerted by the counterbalance mechanism may be chosen such that the table top will automatically raise or move upwardly into its upper reference position upon unlatching movement of lower latch arm 106a from engagement with adjustment 96, or fall or move downwardly into its lower reference position upon unlatching movement of upper latch arm 106b from engagement with the adjustment block. In any event, operation of mechanism 14 is such as to define two positions between which table top 10 may be alternatively moved and thereafter permit selective fine adjustments of the actual height of the table top adjacent such positions by user initiated operation of the adjustment control mechanism.

While straight line motion mechanism 24 has been described with particular reference to its use for effecting vertical movements of a table top through a maximum distance essentially corresponding to the contracted height of the mechanism, it is contemplated that use of the mechanism is not so restricted. Thus, as by way of example, the orientation of mechanism 14 is not limiting on its use, since the mechanism may be readily adapted for horizontally directed movements, such as would be involved in supporting a shelf or drawer for horizontal open and closing movements. Further, mechanism 14 need not be used in combination with an adjustment mechanism of the type described, and in the absence of constraints or abutments limiting the contracted and extended conditions of mechanism 14, the permissible extent of movement of mechanism 14 is limited only by the requirement that the extent of pivotal movement of pairs of links 38a,38b and 44a,44b cannot exceed 180 degrees.

What is claimed is:

1. A straight line motion mechanism comprising in combination:
   a first parallelogram linkage mechanism formed of facing first and second link members and a first pair of facing links having their opposite ends pivotally connected to said first and second link members;
   a second parallelogram linkage mechanism formed of said second link member and a third link member arranged in a facing relationship to said second link member and a second pair of facing links having their opposite ends pivotally connected to said second and third link members, said first and second pairs of facing links having equal lengths; and
   motion control means interconnecting said first and second linkage mechanisms for constraining said first and second pairs of facing links to undergo equal angular displacements about their points of pivotal connection to said first, second and third link members to effect straight line movement of said third link member relative to said first link member along a path of travel in a direction extending through said points of pivotal connection of said third link member to said second pair of facing links, and said points of pivotal connection of the ends of said first and second pairs of facing links to said second link member are coaxial with and pivot about a pair of parallel axes.

2. A straight line motion mechanism comprising in combination:
   a first parallelogram linkage mechanism formed of facing first and second link members and a first pair of facing links having their opposite ends pivotally connected to said first and second link members;
   a second parallelogram linkage mechanism formed of said second link member and a third link member arranged in a facing relationship to said second link member and a second pair of facing links having their opposite ends pivotally connected to said second and third link members, said first and second pairs of facing links having equal lengths; and
   motion control means interconnecting said first and second linkage mechanisms for constraining said first and second pairs of facing links to undergo equal angular displacements about their points of pivotal connection to said first, second and third link members to effect straight line movement of said third link member relative to said first link member along a path of travel in a direction extending through said points of pivotal connection of said third link member to said second pair of facing links, and said motion control means includes a first rack member extending in said direction of said path of travel and fixed against movement along said path of travel, a second rack member arranged in a facing relationship with said first rack member and fixed to said third link member for movement therewith along said path of travel, a gear operably engaging said first and second rack members whereby to transmit motion therebetween, and means coupling said gear for movement with said second link member in said direction of said path of travel without requiring movement of said gear with said second link member in a direction transversely of said path of travel.

3. A straight line motion mechanism according to claim 2, wherein said points of pivotal connection of the ends of said first and second pairs of facing links to said second link member are coaxial with and pivot about a pair of parallel axes.

4. A straight line motion mechanism comprising in combination:
   a first parallelogram linkage mechanism formed of facing first and second link members and a first pair of facing links having their opposite ends pivotally connected to said first and second link members;
   a second parallelogram linkage mechanism formed of said second link member and a third link member arranged in a facing relationship to said second link member and a second pair of facing links having their opposite ends pivotally connected to said second and third link members, said first and second pairs of facing links having equal lengths;
   motion control means interconnecting said first and second linkage mechanisms for constraining said first and second pairs of facing links to undergo equal angular displacements about their points of pivotal connection to said first, second and third link members to effect straight line movement of said third link member relative to said first link member along a path of travel in a direction extending through said points of pivotal connection of said third link member to said second pair of facing links;
   latch means for releasably retaining said third link member alternatively in first and second positions relative to said first link member which are spaced apart along said path of travel; and adjustment means operable when said third link member is in one of said first and second positions for adjusting the position of said third link member relative to said first and second positions to assume adjusted positions in alignment with said path of travel, said third link member being automatically repeatably moved into said first and second positions or said adjusted positions in the absence of further adjustments by said adjustment means.

5. A straight line motion mechanism according to claim 4, wherein said adjustment means includes an adjustment screw rotatably supported by said third link member to extend in said direction of said path of travel and an adjustment member threadably supported by said screw device and fixed against rotation relative to said first link member, wherein rotations of said adjustment screw effects relative movement of said adjustment screw and said adjustment member along said path of travel, and said latch means is carried by said first link member and releasably engages with said adjustment member to alternately retain said adjustment member in first and second positions thereof corresponding to said first and second positions of said third link member, and rotations of said adjustment screw relative to said adjustment member, while in said first and second positions thereof, effecting adjustments of the position of said third link member relative to said first and second positions thereof.

6. A straight line motion mechanism according to claim 5, wherein bias means are provided for biasing said third link member for movement from said first position towards said second position thereof.

7. A straight line motion mechanism according to claim 5, wherein said motion control means includes a first rack member extending in said direction of said path of travel and fixed against movement along said path of travel, a second rack member arranged in facing relationship with said first rack member and fixed to said third link member for movement therewith along said path of travel, a gear operably engaging with said first and second rack members, whereby to transmit motion therebetween, and means coupling said gear for movement with said second link member in said direction of said path of travel without requiring movement of said gear with said second link member in a direction transversely of said path of travel.

8. A straight line motion mechanism comprising in combination:
a first parallelogram linkage mechanism formed of parallel first and second link members and a first pair of parallel facing links having their opposite ends pivotally connected to said first and second link members;
a second parallelogram linkage mechanism formed of said second link member and a third link member arranged parallel thereto and a second pair of parallel facing links having their opposite ends pivotally connected to said second and third link members; and
motion control means interconnecting said first and second linkage mechanisms to effect straight line movement of said third link member along a path of travel extending lengthwise of said first link member, said third link member being characterized as having contracted, intermediate and extended positions relative to said first link member, said first and second pair sof acing links forming essentially equal and opposite angles relative to a line drawn normal to said first, second and thid link members throughout the range of movement of said third link member between said contracted and intermediate positions and between said intermediate and extended positions and forming equal angles with said line when said third link member is disposed in said intermediate position, and the lengths of said first, second and third link members as measured between their respective points of pivotal connection to said first and second pairs of facing links are equal and the points of pivotal connection of said first and second pairs of facing links to said second link member are coaxial with and pivot about a pair of parallel axes.

9. A straight line motion mechanism comprising in combination:
a first parallelogram linkage mechanism formed of parallel first and second link members and a first pair of parallel facing links having their opposite ends pivotally connected to said first and second link members;
a second parallelogram linkage mechanism formed of said second link member and a third link member arranged parallel thereto and a second pair of parallel facing links having their opposite ends pivotally connected to said second and third link members;
motion control means interconnecting said first and second linkage mechanisms to effect straight line movement of said third link member along a path of travel extending lengthwise of said first link member, said third link member being characterized as having contracted, intermediate and extended positions relative to said first link member, said first and second pairs of facing links forming essentially equal and opposite angles relative to a line drawn normal to said first, second and third link members throughout the range of movement of said third link member between said contracted and intermediate positions and between said intermediate and extended positions and forming equal angles with said line when said third link member is disposed in said intermdiate position, said motion control means includes a first rack member extending in said direction of said path of travel and fixed against movement along said path of travel, a second rack member arranged in a facing relationship with said first rack member and fixed to said third link member for movement therewith along said path of travel, a gear operably engaging said first and second rack members whereby to transmit motion therebetween, and means coupling said gear for movement with said second link member in said direction of said path of travel without requiring movement of said gear with said second link member in a direction transversely of said path of travel;
an adjustment screw carried by said third link member for movement therewith and for relative rotational movement about an axis extending along said path of travel;
an adjustment member threadably coupled to said adjustment screw;
means carried by said first link member for guiding said adjustment member for sliding movement along said path of travel while preventing rotational movements of said adjustment member relativ to said first link member; and means for releasably retaining said adjustment member in first and second positions spaced apart along said path of travel.

10. A mechanism for adjusting the position of a movable member relative to a stationary member adjacent first and second positions arranged along a path of travel of said movable member throughout which said movable member undergoes essentially straight line reciprocating movement, said mechanism comprising in combination:

an adjustment screw carried by said movable member for movement therewith along said path of travel and for relative rotational movement about an axis extending along said path of travel;

an adjustment member threadably supported by said adjustment screw and carried thereby for movement along said path of travel, said adjustment member bing fixed against rotation relative to said movable and stationary members, whereby rotations of said adjustment screw effects relative axial movements between said adjustment screw and said adjustment member; and latch means for releasabley retaining said adjustment member alternately in first and second positions spaced apart along said path of travel for defining said first and second positions of said movable member, whereat rotations of said adjustment screw relativ to said adjustment member effects adjustment sof the position of said movable member relative to said first and second positions thereof.

11. A mechanism according to claim 10, wherein said stationary member includes a guide means for slidably engaging said adjustment member and constraining same against rotation throughout the range of movement of said adjustment member between said first and second positions thereof, and said latch means includes first and second abutments carried by said guide means for alternate engagement by said adjustment member to limit movement thereof beyond said first and second positions thereof and a pair of latch arms releasably engageable with said adjustment member and cooperating with said abutments to releasably retain said adjustment member alternatively in said first and second positions thereof.

12. A mechanism according to claim 10, wherein said stationary member includes guide means fixed to said stationary member for constraining said adjustment member against rotation, while permitting sliding movement of said adjustment member relative to said stationary member along said path of travel, said adjustment member is formed with a release slot extending therethrough in a direction aligned with said path of travel, and said latch means includes first and second abutment means fixed relative to said stationary member, a pair of latch arms carried by said stationary member for swinging movement about an axis extending along said path of travel between latched positions out of alignment with said release slot, wherein said latch arms alternatively cooperate with said first and second abutments for releasably retaining said adjustment member in said first and second positions thereof, and release portions disposed in alignment with said release slot to permit sliding movement of said adjustment member between said first and second positions thereof, and a guide member having opposite ends thereof fixed to said latch arms and arranged for receipt within said release slot for preventing movement of said latch arms from said release positions into said latched positions, during sliding movement of said adjustment member between said first and second positions thereof.

13. A mechanism for supporting an object for vertically directed movements along a path of travel including lower and upper reference positions and for permitting independent vertical adjustments of said reference positions, said mechanism comprising in combinatin;

an upstanding stationary member;

a movable member for attachment to said object;

means for supporting said movable member on said stationary member for movement relative thereto along said path of travel;

a vertically elongated adjustment screw carried by said movable member for movement vertically therewith and for relative rotational movement about an axis aligned with said path of travel;

an adjustment member threadably supported by said adjustment screw;

guide means carried by said stationary member for constraining said adjustment member from rotation relative thereto while permitting vertically directed sliding movements thereof relative to said stationary member along said path of travel;

means carried by said stationary member for releasably latching said adjustment member alternately in lower and upper positions spaced apart along said path of travel for defining said reference positions of said object, whereat rotations of said adjustment screw relative to said adjustment member effects vertical adjustments of said reference positions; and means for biasing said object for movement upwardly towards said upper reference position.

14. A mechanism according to claim 13, wherein said means for supporting said movable member on said stationary member is a straight line motion mechanism including a first parallelogram linkage mechanism formed of said stationary member and a link member arranged parallel thereto and a first pair of parallel facing links having their opposite ends pivotally connected to said stationary member and said link member;

a second parallelogram linkage mechanism formed of said link member and said movable member arranged parallel thereto and a second pair of parallel facing links having their opposite ends pivotally connected to said link member and said movable member, said first and second pairs of links being of equal length; and motion control means interconnecting said first and second linkage mechanisms for constraining said first and second pairs of facing links to undergo equal angular displacements about their points of pivotal connection to said stationary member, said link member and said movable member to effect straight line movement of said movable member relative to said stationary member.

15. A mechanism according to claim 14, wherein said motion controlmeans includes a first rack member extending along said path of travel and fixed against vertically directed movement, a second rack member arranged in a facing relationship with said first rack member and fixed to said movable member for movement therewith along said path of travel, a gear operably engaging said first and second rack members whereby to transmit motion therebetween, and means coupling said gear for movement with said link member in a direction extending along said path of travel without requiring movement of said gear with said link member in a direction transversely of said path of travel.

16. A mechanism according to claim 15, wherein said adjustment member is formed with a release slot extending therethrough in a direction aligned with the direction of sliding movement thereof, and said means for releasably latching said adjustment member alternately in said lower and upper positions thereof includes first and second abutments fixed to said guide means in a vertically spaced relationship, a pair of latch arms carried by said stationary member for swinging movement about an axis aligned with said direction of sliding movement between latched positions out of alignment with said release slot, wherein said latch arms alternately cooperate with said first and second abutments for releasably latching said adjustment member in said lower and upper positions thereof, and release positions disposed in alignment with said release slot to permit sliding movements of said adjustment member between said first and second positions thereof, and a guide member having opposite ends thereof fixed to said latch arms and arranged for receipt within said release slot for preventing movement of said latch arms from said release positions into said latched positions, during sliding movement of said adjustment member between said first and second positions thereof.

17. A mechanism for supporting a movable member for movement along a path of travel relative to a stationary member, said mechanism comprising in combination:

means for supporting said movable member on said stationary member for movement along said path of travel;

an adjustment member;

means for supporting said adjustment member on said movable member for movement therewith along said path of travel while permitting adjustments of the position of said adjustment member relative to said movable member in the direction of said path of travel; and means fixed relative to said stationary member for releasably retaining said adjustment member alternately in first and second positions spaced apart along said path of travel.

18. A mechanism according to claim 17, wherein said means for supporting said movable member is a straight line motion mechanism including a first parallelogram linkage mechanism formed of said stationary member and a link member arranged parallel thereto and a first pair of parallel facing links having their opposite ends pivotally connected to said stationary member and said link member; a second parallelogram linkage mechanism formed of said link member and said movable member arranged parallel thereto and a second pair of parallel facing links having their opposite ends pivotally connected to said link member and said movable member, said first and second pairs of facing links are of equal length and the points of pivotal connection of said first and second pairs of facing links to said link member are coaxial; and motion control means interconnecting said first and second linkage mechanisms to effect straight line movement of said movable member along said path of travel characterized in that said first and second pairs of facing links undergo equal angular displacements about their points of pivotal connection to said stationary member, said link member and said movable member.

* * * * *

UNITED STATES PATENT AND TRADEMARK OFFICE
CERTIFICATE OF CORRECTION

PATENT NO. : 4,747,353

DATED : May 31, 1988

INVENTOR(S) : Richard L. Watt

It is certified that error appears in the above-identified patent and that said Letters Patent is hereby corrected as shown below:

Col. 2, line 47 - "so" should be --20--.

Col. 4, line 60 - "the" should be --that--;

line 61 - the first occurrence of "to" should be --in--.

Col. 5, line 2 - "adjustable" should be --adjustment--.

Col. 6, line 32 - "desired" should be --desires--.

Col. 7, line 11 - after "adjustment", insert --block--.

Col. 11, line 1 - "relativ" should be --relative--.

Col. 11, line 20 - "bing" should be --being--.

Col. 11, line 30 - "relativ" should be --relative--.

Signed and Sealed this

First Day of November, 1988

*Attest:*

DONALD J. QUIGG

*Attesting Officer*    *Commissioner of Patents and Trademarks*